United States Patent
Nakamura et al.

(10) Patent No.: US 6,645,897 B2
(45) Date of Patent: Nov. 11, 2003

(54) DIELECTRIC CERAMIC COMPOSITION AND LAMINATED CERAMIC CAPACITOR

(75) Inventors: Tomoyuki Nakamura, Yasu-gun (JP); Kotaro Hata, Kyoto (JP); Harunobu Sano, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 149 days.

(21) Appl. No.: 09/993,237

(22) Filed: Nov. 5, 2001

(65) Prior Publication Data

US 2002/0098969 A1 Jul. 25, 2002

(30) Foreign Application Priority Data

Nov. 24, 2000 (JP) .......................... 2000-357050

(51) Int. Cl.$^7$ .......................... C04B 35/468; H01G 4/10
(52) U.S. Cl. .................. 501/137; 501/138; 501/139; 361/306.3; 361/321.4
(58) Field of Search .......................... 501/137, 138, 501/139; 361/306.3, 321.4

(56) References Cited

U.S. PATENT DOCUMENTS

| | | | | |
|---|---|---|---|---|
| 5,248,640 A | * | 9/1993 | Sano et al. | 501/137 |
| 5,877,934 A | * | 3/1999 | Sano et al. | 361/312 |
| 5,995,360 A | * | 11/1999 | Hata et al. | 361/321.5 |
| 6,058,005 A | * | 5/2000 | Matoba et al. | 361/321.4 |
| 6,195,250 B1 | * | 2/2001 | Matoba et al. | 361/321.5 |
| 6,310,761 B1 | * | 10/2001 | Hori et al. | 361/321.2 |

FOREIGN PATENT DOCUMENTS

| | | |
|---|---|---|
| JP | 57-42588 | 9/1982 |
| JP | 61-101459 | 5/1986 |
| JP | 62-256422 | 11/1987 |
| JP | 05-009066 | 1/1993 |
| JP | 05-009067 | 1/1993 |
| JP | 05-009068 | 1/1993 |
| JP | 2000-154055 A | 6/2000 |

OTHER PUBLICATIONS

Copy of Japanese Office Action dated Apr. 8, 2003 (and English translation of relevant portion).

* cited by examiner

*Primary Examiner*—David Brunsman
(74) *Attorney, Agent, or Firm*—Dickstein, Shapiro, Morin & Oshinsky, LLP.

(57) ABSTRACT

Provided is a dielectric ceramic composition suitably used for forming dielectric ceramic layers which constitute a laminated ceramic capacitor obtained by firing in a reducing atmosphere. Even when the dielectric ceramic composition is formed into thin dielectric ceramic layers, a highly reliable laminated ceramic capacitor having a small temperature coefficient of capacitance, a long lifetime under high temperature and high pressure conditions, and a small change in electrostatic capacitance with time under a DC voltage application can be realized. The dielectric ceramic composition contains a primary component, an additive component, and an auxiliary sintering agent, wherein the primary component and the additive component are represented by the formula $100BaTiO_3+a\{(1-b)R+bV\}+cM$, and $1.25 \leq a \leq 8.0$, $0 < b \leq 0.2$, $1.0 < c \leq 6.0$, and $a/c > 1.1$ are satisfied. R is a compound containing at least one element selected from the group consisting of La, Ce, Pr, Nd, Sm, Eu, Gd, Th, Dy, Ho, Er, Tm, Yb and Lu; V is a compound containing vanadium; and M is a compound containing at least one element selected from the group consisting of Mn, Ni, Mg, Fe and Zn.

20 Claims, 1 Drawing Sheet

US 6,645,897 B2

DIELECTRIC CERAMIC COMPOSITION AND LAMINATED CERAMIC CAPACITOR

BACKGROUND OF THE INVENTION

1. Field of the Invention

The present invention relates to dielectric ceramic compositions and laminated ceramic capacitors formed by using the same, and more particularly, relates to a dielectric ceramic composition for forming thin dielectric ceramic layers having a small temperature coefficient of relative dielectric constant and to a highly reliable laminated ceramic capacitor composed of the thin dielectric ceramic layers.

2. Description of the Related Art

In general, laminated ceramic capacitors have been manufactured by the method described below.

First, ceramic green sheets, which are composed of materials for forming a dielectric ceramic and are provided with a conductive material, are prepared. The conductive material is provided on surfaces of the green sheets and is formed into internal electrodes having predetermined patterns. As the materials for forming the dielectric ceramic, a material primarily composed of, for example, barium titanate is used.

Next, a plurality of ceramic green sheets including the ceramic green sheets provided with the conductive material described above are laminated to each other and is bonded together by applying heat and pressure, thereby forming an integral green laminate.

Next, this green laminate is fired, thereby forming a sintered laminate. The internal electrodes composed of the conductive material described above are formed inside this laminate.

External electrodes are formed on external surfaces of the laminate while being electrically connected to predetermined internal electrodes. The external electrodes are formed by, for example, applying a conductive paste containing powdered conductive metal and a glass frit to the external surfaces of the laminate followed by firing. A laminated ceramic capacitor is thus formed.

As the conductive material for forming the internal electrodes described above, a relatively inexpensive base metal, such as nickel or copper, has been frequently used in recent years in place of an expensive noble metal, such as platinum, palladium, or a silver-palladium alloy, in order to decrease the production cost of laminated ceramic capacitors as low as possible. However, when a laminated ceramic capacitor having internal electrodes which contain a base metal is manufactured, firing must be performed in a neutral or a reducing atmosphere in order to prevent the base metal from being oxidized during firing, and hence, a dielectric ceramic composition for forming the laminated ceramic capacitor must have reduction resistance.

As the dielectric ceramic composition having reduction resistance described above, for example, there may be mentioned a dielectric ceramic composition disclosed in Japanese Examined Patent Application Publication No. 57-42588, which is a solid solution composed of a barium titanate in which the ratio of barium to titanium is not less than 1, that is, is not less than the stoichiometric ratio; a dielectric ceramic composition disclosed in Japanese Unexamined Patent Application Publication No. 61-101459, which is a solid solution composed of barium titanate containing a rare earth oxide composed of, for example, lanthanum (La), neodymium (Nd), samarium (Sm), dysprosium (Dy), or yttrium (Y); and a $BaTiO_3$-$CaZrO_3$-MnO-MgO-based dielectric ceramic composition which has been disclosed in, for example, Japanese Unexamined Patent Application Publication No. 62-256422 as a composition having a smaller temperature coefficient of relative dielectric constant.

When the dielectric ceramic composition described above is fired in a reducing atmosphere, a sintered ceramic material having no semiconductive properties, that is, a dielectric ceramic layer for forming a laminated ceramic capacitor, can be obtained, whereby an inexpensive laminated ceramic capacitor having internal electrodes composed of a base metal such as nickel can be formed.

Concomitant with the recent advance of electronic technology, there has been an increasing trend toward miniaturization of electronic elements, and the miniaturization and larger capacitance of laminated ceramic capacitors have also been actively pursued. Accordingly, dielectric ceramic compositions which are formed into thin layers having a small temperature coefficient of relative dielectric constant, superior insulating properties and superior reliability have been increasingly in demand.

Although the dielectric ceramic compositions disclosed in Japanese Examined Patent Application Publication No. 57-42588 and Japanese Unexamined Patent Application Publication No. 61-101459 can form a material having a high relative dielectric constant, the sintered materials thereof have larger crystal particles, and when the thickness of dielectric ceramic layers forming a laminated ceramic capacitor is 10 $\mu$m or less, the number of crystal particles existing in each dielectric ceramic layer is decreased, whereby a problem may arise in that the reliability of the laminated ceramic capacitor is decreased. In addition, since there is still another problem in that the temperature coefficient of relative dielectric constant is large, the dielectric ceramic composition described above has not satisfactory met the requirements from the market.

In contrast, the dielectric ceramic composition disclosed in Japanese Unexamined Patent Application Publication No. 62-256422 can form a material having a relatively high dielectric constant, and the sintered material thereof has small crystal particles and has also small temperature coefficient of relative dielectric constant. However, $CaZrO_3$ and $CaTiO_3$ formed during a firing step are likely to produce a secondary phase together with MnO and the like, and hence, there may be a problem of inferior reliability at a high temperature.

In order to solve the problems described above, a $BaTiO_3$-rare earth oxide-$Co_2O_3$-based composition has been proposed in Japanese Unexamined Patent Application Publication Nos. 5-9066, 5-9067, and 5-9068.

However, the reliability required by the market has recently become increasingly demanding, and dielectric ceramic compositions which are formed into dielectric ceramic layers having further improved reliability have been strongly desired. In addition, thinner dielectric ceramic layers have also been increasingly required in order to obtain a larger capacitance of the laminated dielectric ceramic capacitors. Furthermore, dielectric ceramic capacitors have been increasingly used under the conditions wherein a high DC voltage is applied for a long period of time, and hence, dielectric ceramic compositions which are formed into dielectric ceramic layers having a smaller change in capacitance with time have also been desired.

In order to satisfy the requirements described above, it becomes necessary to realize highly reliable laminated ceramic capacitors having small changes in capacitance and insulating resistance with time under a high electric field even when the laminated capacitor is formed of thinner dielectric ceramic layers.

SUMMARY OF THE INVENTION

Accordingly, an object of the present invention is to provide a dielectric ceramic composition for forming a material which satisfies the B characteristic specified by Japanese Industrial Standard (JIS) and/or the X7R characteristic specified by Electronic Industries Association (EIA), which has a CR product of 5,000 $\Omega \cdot F$ or more, the CR product being the product of the insulating resistance and the electrostatic capacitance at an electric field of 3 kV/mm, which has stable insulating properties under conditions of high temperature and high voltage application, and which has superior reliability and a significantly small change in capacitance with time even when the dielectric ceramic composition is formed into a thin-film material. In addition, the present invention provides a laminated ceramic capacitor formed by using the dielectric ceramic composition described above.

A dielectric ceramic composition according to the present invention comprises a primary component having a perovskite structure represented by the formula $ABO_3$; and an additive component represented by the formula $a\{(1-b)R+bV\}+cM$. In the formula $ABO_3$, A is barium (Ba) which may be partly replaced with strontium (Sr) or calcium (Ca), and B is titanium (Ti) which may be partly replaced with zirconium (Zr) or hafnium (Hf). In the formula $a\{(1-b)R+bV\}+cM$, R is a compound containing at least one element selected from the group consisting of lanthanum (La), cesium (Ce), praseodymium (Pr), neodymium (Nd), samarium (Sm), europium (Eu), gadolinium (Gd), terbium (Th), dysprosium (Dy), holmium (Ho), erbium (Er), thulium (Tm), ytterbium (Yb) and lutetium (Lu); V is a compound containing vanadium (V); M is a compound containing at least one selected from the group consisting of manganese (Mn), nickel (Ni), magnesium (Mg), iron (Fe) and zinc (Zn); and a, b and c indicate the number of moles of the compounds R, V and M.

In addition, when the primary component and the additive component are represented by the formula $100ABO_3+a\{(1-b)R+bV\}+cM$, then $1.25 \leq a \leq 8.0$, $0 < b \leq 0.2$, $1.0 < c \leq 6.0$, and $a/c > 1.1$ are satisfied.

In the above formula $ABO_3$, the ratio of A to B is not limited to 1; however, the ratio of A to B is preferably in the range of from about 1.00 to 1.02.

Furthermore, the dielectric ceramic composition of the present invention contains an auxiliary sintering agent.

In the dielectric ceramic composition of the present invention, it is preferable that the auxiliary sintering agent mentioned above be an oxide containing at least one of boron (B) and silicon (Si), and that the content be in the range of from about 0.2 to 2.0 parts by weight with respect to 100 parts by weight of the primary component.

The present invention also provides a laminated ceramic capacitor formed by using the dielectric ceramic composition described above.

The laminated ceramic capacitor according to the present invention comprises a laminate having a plurality of dielectric ceramic layers laminated to each other and internal electrodes formed along specific interfaces between the dielectric ceramic layers; and external electrodes formed on external surfaces of the laminate while being electrically connected to specific electrodes among the internal electrodes; wherein the dielectric ceramic layers are each formed of a sintered body of the dielectric ceramic composition described above, and the internal electrodes contain a base metal as a conductive component.

DESCRIPTION OF THE PREFERRED EMBODIMENTS

Figure 1:
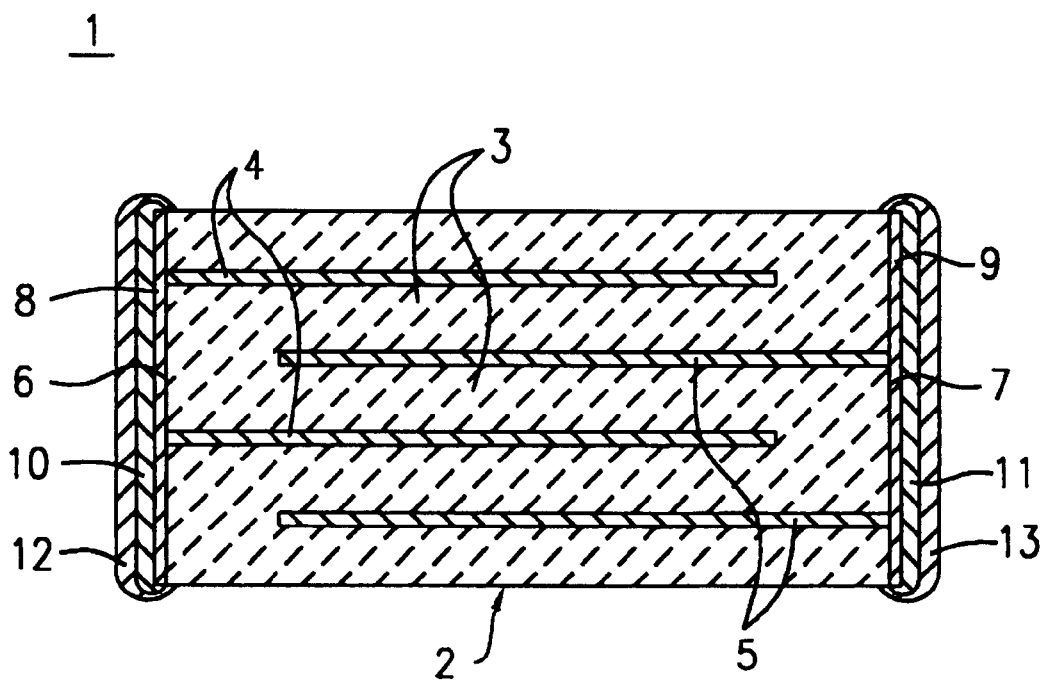
FIG. 1 is a schematic cross-sectional view showing a laminated ceramic capacitor according to an embodiment of the present invention.

FIG. 1 is a cross-sectional view schematically showing a laminated ceramic capacitor 1 according to an embodiment of the present invention.

The laminated ceramic capacitor 1 comprises a laminate 2. The laminate 2 is composed of a plurality of dielectric ceramic layers 3 laminated to each other, and a plurality of internal electrodes 4 and 5 provided along specific interfaces between the plurality of dielectric ceramic layers 3. The internal electrodes 4 and 5 are formed so as to be extended to external surfaces of the laminate 2, and the internal electrodes 4 extended to one side surface 6 of the laminate 2 and the internal electrodes 5 extended to the side surface 7 opposite to the side surface 6 are alternately disposed in the laminate 2.

External electrodes 8 and 9 are formed on the side surfaces 6 and 7, that is, on the external surfaces of the laminate 2, respectively. In addition, first plating layers 10 and 11 composed of nickel, copper or the like, are formed on the external electrodes 8 and 9, respectively, and on the surfaces of the first plating layers 10 and 11, second plating layers 12 and 13 composed of solder, tin or the like, are formed, respectively. The formation of the plating layers 10 to 13 on the external electrodes 8 and 9 may be omitted in some cases depending on applications of the laminated ceramic capacitor 1.

In the laminated ceramic capacitor 1 described above, the dielectric ceramic layer 3 is composed of a sintered body of the dielectric ceramic composition described below.

That is, the dielectric ceramic composition is a composition comprising a primary component having a perovskite structure represented by the formula $ABO_3$ and an additive component represented by the formula $a\{(1-b)R+bV\}+cM$. In the formula $ABO_3$, A is Ba which may be partly replaced with Sr or Ca, and B is Ti which may be partly replaced with Zr or Hf. In the formula $a\{(1-b)R+bV\}+cM$, R is a compound containing at least one element selected from the group consisting of La, Ce, Pr, Nd, Sm, Eu, Gd, Tb, Dy, Ho, Er, Tm, Yb, and Lu; V is a compound containing vanadium; M is a compound containing at least one element selected from the group consisting of Mn, Ni, Mg, Fe, and Zn; and a, b, and c indicate the number of moles of the compounds.

When the primary component and the additive component are represented by the formula $100ABO_3+a\{(1-b)R+bV\}+cM$, then $1.25 \leq a \leq 8.0$, $0 < b \leq 0.2$, $1.0 < c \leq 6.0$, and $a/c > 1.1$ are desirably satisfied.

In addition, this dielectric ceramic composition contains an auxiliary sintering agent. The auxiliary sintering agent is preferably an oxide containing at least one of B and Si, and the dielectric ceramic composition described above preferably contains about 0.2 to 2.0 parts by weight of the auxiliary sintering agent with respect to 100 parts by weight of the primary component.

Even when the dielectric ceramic composition described above is fired in a reducing atmosphere for forming the dielectric ceramic layer 3, it is possible, without degrading the characteristics, to obtain a dielectric ceramic layer having a small temperature coefficient of electrostatic capacitance such that the B characteristic specified by JIS and/or the X7R characteristic specified by EIA are satisfied; a small dielectric loss; a long lifetime in an accelerated test under high temperature and high pressure conditions; and a small decrease in electrostatic capacitance with time. Accordingly, even when very thin dielectric ceramic layers 3 having a thickness of, for example, about 3 μm or less are used, a highly reliable laminated ceramic capacitor 1 can be formed. Hence, the trend toward a compact laminated ceramic capacitor having a larger capacitance and higher reliability can be further advanced.

In addition, the dielectric ceramic composition described above can be fired in a reducing atmosphere without causing any problems, since a base metal, such as nickel, a nickel alloy, copper, or a copper alloy, can be used as the conductive component contained in the internal electrodes 4 and 5. In addition, a small amount of powdered ceramic may be contained in a material for forming the internal electrodes 4 and 5.

During the step of preparing powdered materials for forming the dielectric ceramic composition or other steps of a manufacturing process for forming the laminated ceramic capacitor 1, aluminum (Al), Zr, Fe, Hf, sodium (Na), nitrogen (N) and the like, may be contained as impurities; however, these impurities may not cause any problems of electrical properties of the laminated ceramic capacitor 1.

The external electrodes 8 and 9 may be formed of a sintered layer containing a powdered conductive metal, such as silver (Ag), palladium (Pd), a Ag—Pd alloy, copper or a copper alloy, or alternatively, the external electrodes may be formed of a sintered layer composed of the powdered conductive metal described above mixed with a glass frit, such as a $B_2O_3$—$Li_2O$—$SiO_2$—BaO—based glass, a $B_2O_3$—$SiO_2$—BaO—based glass, a $Li_2O$—$SiO_2$—BaO—based glass, or a $B_2O_3$—$SiO_2$—ZnO—glass. When the latter sintered layer is used, a small amount of powdered ceramic may be present.

Next, the reason why the range of this dielectric ceramic composition is specified as described above will be described, and examples made in order to verify the advantages of the present invention will also be described.

EXAMPLES

First Example

First, after $TiCl_4$ and $Ba(NO_3)_2$ having a purity of 99.9% or more were prepared and weighed, and a precipitate of barium titanyl oxalate in the form of $\{BaTiO(C_2O_4)\cdot 4H_2O\}$ was obtained by using oxalic acid. The precipitate was pyrolyzed at a temperature of 1,000° C. or more, thereby forming $BaTiO_3$ used as a primary component.

In addition, $La_2O_3$, $CeO_2$, $Pr_6O_{11}$, $Nd_2O_3$, $Sm_2O_3$, $Eu_2O_3$, $Tb_2O_3$, $Tm_2O_3$, $Gd_2O_3$, $Dy_2O_3$, $Ho_2O_3$, $Er_2O_3$, $Yb_2O_3$, $Lu_2O_3$, $V_2O_5$, MnO, MgO, NiO, $Fe_2O_3$ and ZnO were prepared for forming additive components, and $SiO_2$ was also prepared as an auxiliary sintering agent.

Next, the powdered primary component and the powdered additive components were mixed together for forming the compositions shown in Table 1 which satisfy the formula $100BaTiO_3+a\{(1-b)R+bV\}+cM$, and the amount of the powdered $SiO_2$ in accordance with that shown in Table 1 was added to each of the composition as the auxiliary sintering agent, thereby yielding powdered mixtures.

In the formula $100BaTiO_3+a\{(1-b)R+bV\}+cM$, R is at least one compound selected from the group consisting of $La_2O_3$, $CeO_2$, $Pr_6O_{11}$, $Nd_2O_3$, $Sm_2O_3$, $Eu_2O_3$, $Tb_2O_3$, $Tm_2O_3$, $Gd_2O_3$, $Dy_2O_3$, $Ho_2O_3$, $Er_2O_3$, $Yb_2O_3$ and $Lu_2O_3$; V is $V_2O_5$; M is at least one compound selected from the group consisting of MnO, MgO, NiO, $Fe_2O_3$ and ZnO; and a, b, and c indicate the number of moles of the compounds mentioned above. In addition, the addition amount of $SiO_2$ shown in Table 1 is represented by parts by weight with respect to 100 parts by weight of the primary component.

TABLE 1

| Sample No. | a $(1-b)R + bV$ | $1-b$ R (La, Ce, Pr, Nd, Sm, Eu, Gd, Tb, Dy, Ho, Er, Tm, Yb, Lu) | | Total of $1-b$ | b V | C M (Mn, Ni, Mg, Fe, Zn)0 | | | Total of c | a/c | $SiO_2$ (parts by weight) |
|---|---|---|---|---|---|---|---|---|---|---|---|
| *1  | 1.20 | Dy 0.80 | Ho 0.10 | 0.90 | 0.10 | Mn 0.80 | Fe 0.25 |        | 1.05 | 1.14 | 0.5 |
| *2  | 8.10 | La 0.40 | Sm 0.45 | 0.85 | 0.15 | Ni 2.00 | Mg 2.00 |        | 4.00 | 2.03 | 1.0 |
| *3  | 2.00 | Tb 0.80 | Yb 0.20 | 1.00 | 0.00 | Mn 1.50 | Ni 0.10 |        | 1.60 | 1.25 | 1.5 |
| *4  | 3.00 | Er 0.10 | Eu 0.10 Ho 0.30 | 0.50 | 0.50 | Mn 1.20 |        |        | 1.20 | 2.50 | 1.0 |
| *5  | 1.30 | Yb 0.85 |         | 0.85 | 0.15 | Mg 0.50 | Ni 0.50 |        | 1.00 | 1.30 | 1.0 |
| *6  | 7.80 | Er 0.90 |         | 0.90 | 0.10 | Mn 2.00 | Fe 2.50 | Zn 2.00 | 6.50 | 1.20 | 0.5 |
| *7  | 1.50 | Tm 0.50 | Yb 0.40 | 0.90 | 0.10 | Ni 1.50 |         |        | 1.50 | 1.00 | 1.0 |
| 8   | 1.25 | Tm 0.35 | Tb 0.50 | 0.85 | 0.15 | Ni 0.50 | Fe 0.60 |        | 1.10 | 1.14 | 0.5 |
| 9   | 8.00 | Ho 0.25 | Eu 0.60 | 0.85 | 0.15 | Mg 1.00 | Zn 0.50 |        | 1.50 | 5.33 | 1.5 |
| 10  | 3.00 | Dy 0.80 |         | 0.80 | 0.20 | Mn 2.00 |         |        | 2.00 | 1.50 | 1.0 |
| 11  | 7.00 | Sm 0.55 | Yb 0.30 | 0.85 | 0.15 | Mn 1.00 | Ni 3.00 | Zn 2.00 | 6.00 | 1.17 | 1.5 |
| 12  | 1.65 | Gd 0.90 |         | 0.90 | 0.10 | Mg 1.50 |         |        | 1.50 | 1.10 | 0.5 |
| 13  | 1.50 | Lu 0.85 |         | 0.85 | 0.15 | Mn 1.20 |         |        | 1.20 | 1.25 | 0.2 |
| 14  | 2.50 | Nd 0.30 | Pr 0.60 | 0.90 | 0.10 | Mg 1.00 | Zn 1.20 |        | 2.20 | 1.14 | 2.0 |
| 15  | 2.50 | Er 0.85 |         | 0.85 | 0.15 | Mg 1.50 |         |        | 1.50 | 1.67 | 1.5 |
| 16  | 3.00 | Yb 0.25 | Ce 0.60 | 0.85 | 0.15 | Mn 0.50 | Mg 1.00 |        | 1.50 | 2.00 | 1.5 |
| 17  | 2.50 | La 0.90 |         | 0.90 | 0.10 | Mn 1.00 | Ni 0.20 |        | 1.20 | 2.08 | 1.0 |

Next, a polyvinyl butyral-based binder and a solvent such as ethyl alcohol were added to the powdered mixture described above, and wet mixing using a ball mill was then performed, thereby yielding a ceramic slurry.

Next, the ceramic slurry was formed into sheets 5 μm thick by a doctor blade method, thereby yielding rectangular ceramic green sheets.

A conductive green paste primarily composed of nickel was applied to the ceramic green sheets by screen printing, thereby forming conductive paste films to be formed into internal electrodes.

A plurality of green sheets including the ceramic green sheets provided with the conductive paste films was laminated to each other so that the conductive paste films adjacent to each other were extended to opposite side surfaces of the laminate, thereby forming a green laminate.

Next, after the green laminate was heated to 350° C. in a nitrogen atmosphere for burning out the binder, the laminate was fired in a reducing atmosphere of $H_2$—$N_2$—$H_2O$ gas at an oxygen partial pressure of $10^{-9}$ to $10^{-12}$ MPa and at a temperature shown in Table 2 for 2 hours, thereby yielding a sintered laminate.

Subsequently, a conductive paste containing silver as a conductive component and a $B_2O_3$—$Li_2O$—$SiO_2$—$BaO$-based glass frit was applied to the two side surfaces of the laminate and was then fired at 800° C. in a nitrogen atmosphere, thereby forming external electrodes electrically connected to the internal electrodes.

The external dimensions of the laminated ceramic capacitor thus formed were 1.6 mm wide, 3.2 mm long and 1.2 mm thick, and the thickness of the dielectric ceramic layer provided between the internal electrodes was 3 μm. In addition, the number of effective dielectric ceramic layers was fifty, and the area of the counter electrode in each layer was 2.1 mm².

Next, various properties of the laminated ceramic capacitors obtained by using the samples were measured, and the evaluation results are shown in Table 2.

More particularly, the relative dielectric constant and the dielectric loss (tan δ) were measured at 25° C., 1 KHz and 1 Vrms.

In order to measure the insulating resistance at an electric field of 3 kV/mm, a DC voltage of 9 V was applied for 2 minutes, the insulating resistance was measured at 25° C., and the product of the electrostatic capacitance (C) and the insulating resistance (R), that is, the CR product, was then obtained.

The temperature coefficient of capacitance was evaluated by the rate of change ($\Delta C/C_{20}$) in electrostatic capacitance between −25° C. to +85° C. based on that at 20° C. and by the rate of change ($\Delta C/C_{25}$) in electrostatic capacitance between −55° C. to +125° C. based on that at 25° C.

In addition, the average lifetime was obtained by performing a high-temperature lifetime test. The insulating resistance over time was measured at 200° C. for 36 specimens by applying a DC voltage so that the electric field is 10 kV/mm, the time was determined when the insulating resistance of the specimen was decreased to 200 kΩ or less, and the average lifetime was then calculated.

The electrostatic capacitance was measured at 125° C., 1 KHz and 1 Vrms after 240 hours from the application of a voltage and was also measured by applying a DC voltage of 3.15 V. Subsequently, the change in capacitance with time was calculated from the electrostatic capacitance thus measured as the rate of change based on the electrostatic capacitance measured at 125° C. immediately after an application of a DC voltage.

TABLE 2

| Sample No. | Firing Temperature (° C.) | Relative Dielectric Constant | tan δ (%) | Rate of Change in Capacitance $\Delta C/C_{20}$ | | Rate of Change in Capacitance $\Delta C/C_{25}$ | | CR Product (Ω · F) | Average Lifetime (Hours) | Rate of Change in Capacitance with Time (%) |
|---|---|---|---|---|---|---|---|---|---|---|
| | | | | −25° C. (%) | +85° C. (%) | −55° C. (%) | +125° C. (%) | | | |
| *1 | 1,180 | 3,680 | 2.2 | 0.3 | −1.9 | −2.5 | −10.5 | 6,500 | 4 | −6.4 |
| *2 | 1,300 | 1,890 | 1.5 | 0.2 | −2.2 | −2.6 | −10.6 | 9,600 | 120 | −0.9 |
| *3 | 1,200 | 3,020 | 1.8 | 0.5 | −1.7 | −2.3 | −9.5 | 8,700 | 140 | −5.4 |
| *4 | 1,200 | 3,130 | 2.0 | 0.4 | −1.9 | −2.4 | −10.1 | 7,600 | 3 | −0.6 |
| *5 | 1,180 | Semiconductorized | | | | | | | | |
| *6 | 1,340 | 1,680 | 1.4 | −1.0 | −2.4 | −2.1 | −11.0 | 6,300 | 140 | −1.7 |
| *7 | 1,200 | 2,790 | 1.8 | −0.9 | −1.8 | −2.2 | −9.5 | 10,600 | 3 | −7.9 |
| 8 | 1,200 | 3,570 | 2.4 | −0.7 | −3.5 | −2.5 | −11.3 | 6,300 | 100 | −1.6 |
| 9 | 1,240 | 2,390 | 1.5 | −0.8 | −1.8 | −2.6 | −11.9 | 7,100 | 180 | −0.4 |
| 10 | 1,220 | 2,940 | 1.9 | −0.5 | −2.0 | −2.3 | −10.8 | 9,800 | 110 | −1.6 |
| 11 | 1,260 | 1,940 | 1.4 | 0.0 | −2.2 | −2.6 | −10.7 | 10,200 | 150 | −1.8 |
| 12 | 1,220 | 3,750 | 2.5 | 0.4 | −2.8 | −2.7 | −11.4 | 8,800 | 120 | −1.9 |
| 13 | 1,240 | 3,420 | 2.0 | 0.3 | −2.2 | −2.2 | −10.6 | 9,800 | 160 | −1.4 |
| 14 | 1,200 | 2,540 | 1.7 | 0.2 | −1.7 | −2.1 | −10.2 | 9,600 | 120 | −1.4 |
| 15 | 1,180 | 2,740 | 1.8 | 0.5 | −1.9 | −2.4 | −9.6 | 5,900 | 150 | −1.3 |
| 16 | 1,200 | 2,660 | 1.9 | 0.4 | −1.8 | −2.1 | −8.9 | 9,800 | 140 | −0.8 |
| 17 | 1,200 | 3,130 | 1.9 | 0.1 | −2.1 | −2.6 | −9.9 | 6,500 | 160 | −0.9 |

Sample numbers provided with asterisks * in Tables 1 and 2 are the samples of comparative examples which are outside the scope of the present invention.

As can be seen from the Table 2 results of the samples within the scope of the present invention, a laminated ceramic capacitor can be obtained having the temperature characteristics of electrostatic capacitance which satisfies the B characteristic specified by JIS and the X7R characteristic specified EIA; a small dielectric loss; a long lifetime obtained in an accelerated test under high temperature and high pressure conditions; and significantly small degradation of electrostatic capacitance with time.

In contrast, when the value a is less than 1.25, the average lifetime obtained in the high-temperature lifetime test is short, and the change in capacitance under a high electric field, that is, the decrease in capacitance, is also significant according to the result of sample 1. On the other hand, according to the result of sample 2, when the value a is more than 8.0, the sintering temperature becomes 1,300° C. or more and the sintering property is considerably degraded.

As can be seen from the result of sample 3, when the value b is zero, although the change in capacitance with time under a high electric field is suppressed to some extent since an appropriate amount of R is present, the absolute value of the change with time is more than 5%. On the other hand, according to the result of sample 4, when the value b is more than 0.2, grain growth of the dielectric ceramic occurs during firing and the average lifetime obtained in the high-temperature lifetime test becomes short.

According to the result of sample 5, when the value c is 1.0 or less, the dielectric ceramic is semiconductorized, that is, the dielectric ceramic develops semiconductive properties during firing, and hence, the obtained laminated ceramic product does not serve as a capacitor. On the other hand, as can be seen from the result of sample 6, when the value c is more than 6, the sintering temperature becomes 1,300° C. or more, and hence, the sintering property is significantly degraded.

In addition, as can be seen from the result of sample 7, when the value a/c is 1.1 or less, the average lifetime obtained in the high-temperature lifetime test becomes short, and in addition, the change in capacitance with time under a high electric field is significant and the decrease in capacitance is also significant.

Second Example

In this second example, the oxides described below were used as the auxiliary sintering agent in place of $SiO_2$ used in the first example.

In order to obtain $0.55B_2O_3$-$0.22Al_2O_3$-$0.03MnO$-$0.20BaO$ (auxiliary sintering agent 1) as an oxide containing the element B, $0.22TiO_2$-$0.45SiO_2$-$0.33CaO$ (auxiliary sintering agent 2) as an oxide containing the element Si, and $0.27Li_2O$-$0.29B_2O_3$-$0.02TiO_2$-$0.42SiO_2$ (auxiliary sintering agent 3) as an oxide containing the elements Si and B, after oxides, carbonate salts, and hydroxides containing the elements described above were weighed, mixed and pulverized, the mixtures thus formed were dried by evaporation, thereby yielding the powdered oxides described above. These oxides were melted in an alumina crucible at 1,300° C., quenched and pulverized, thereby yielding powdered oxide glasses each having an average diameter of 1.0 μm or less.

Next, in a manner equivalent to that in the first example, powdered $BaTiO_3$ as the primary component and powdered $Ho_2O_3$, $V_2O_5$, MnO and MgO for forming the additive component were mixed together so as to obtain the composition represented by the formula $100BaTiO_3$+2.5 $(0.85HoO_2$+$0.15V_2O_5)$+$0.5MnO$+$1.0MgO$, and in addition, the auxiliary sintering agents 1, 2, or 3 was added so that the content thereof was as those shown in Table 3, thereby yielding a powdered mixture.

TABLE 3

| Sample # | Auxiliary Sintering Agent (parts by weight) | | |
|---|---|---|---|
| | 1 | 2 | 3 |
| 101 | 0.2 | | |
| 102 | 2.0 | | |
| 103 | 1.0 | | |
| 104 | | 0.2 | |
| 105 | | 2.0 | |
| 106 | | | 0.2 |
| 107 | | | 2.0 |

Next, by using powdered mixtures thus formed, laminated ceramic capacitors for evaluation were formed at sintering temperatures shown in Table 4 in a manner equivalent to that in the first example.

Subsequently, the relative dielectric constant, the dielectric loss (tan δ), the temperature coefficient of capacitance ($\Delta C/C_{20}$ and $\Delta C/C_{25}$), the CR product, the average lifetime and the rate of change in capacitance with time were measured for the laminated ceramic capacitors thus formed in a manner equivalent to that in the first example. The results are shown in Table 4.

TABLE 4

| Sample No. | Firing Temperature (° C.) | Relative Dielectric Constant | tan δ (%) | Rate of Change in Capacitance $\Delta C/C_{20}$ | | Rate of Change in Capacitance $\Delta C/C_{25}$ | | CR Product (Ω · F) | Average Lifetime (Hours) | Rate of Change in Capacitance with Time (%) |
|---|---|---|---|---|---|---|---|---|---|---|
| | | | | −25° C. (%) | +85° C. (%) | −55° C. (%) | +125° C. (%) | | | |
| 101 | 1,260 | 2,860 | 1.6 | 0.4 | −1.8 | −2.1 | −8.9 | 9,800 | 140 | −1.4 |
| 102 | 1,180 | 2,740 | 2.3 | 0.3 | −2.2 | −2.2 | −10.6 | 9,800 | 100 | −0.9 |
| 103 | 1,220 | 2,800 | 1.9 | 0.3 | −2.0 | −2.2 | −9.3 | 9,400 | 120 | −1.0 |
| 104 | 1,260 | 2,760 | 1.8 | 0.2 | −1.7 | −2.1 | −9.8 | 9,600 | 180 | −1.4 |
| 105 | 1,180 | 2,640 | 1.8 | 0.5 | −1.9 | −2.4 | −10.2 | 5,900 | 110 | −1.3 |
| 106 | 1,260 | 2,820 | 1.6 | 0.4 | −1.8 | −2.1 | −8.9 | 9,800 | 140 | −1.4 |
| 107 | 1,180 | 2,670 | 2.2 | 0.1 | −2.1 | −2.6 | −9.9 | 6,500 | 100 | −1.1 |

As can be seen from Table 4, when about 0.2 to 2.0 parts by weight of the oxide containing at least one of B and Si is present as the auxiliary sintering component with respect to 100 parts by weight of the primary component, a laminated ceramic capacitor can be obtained having temperature properties of electrostatic capacitance which can meet the B characteristic specified by JIS and the X7R characteristic specified by EIA; a small dielectric loss; a long lifetime measured under high temperature and high pressure conditions; and small degradation of electrostatic capacitor with time.

Although the powder barium titanate prepared by the oxalic acid method was used as the primary component in the first and the second examples, powdered barium titanate which is prepared by an alkoxide method or a hydrothermal synthetic method may also be used. When the powdered barium titanate prepared by the latter method is used, the properties may be improved compared to those obtained in the first and the second examples in some cases.

In addition, even when the dielectric ceramic composition of the present invention contains molybdenum (Mo), tungsten (W), niobium (Nb), tantalum (Ta), yttrium (Y) or antimony (Sb), the properties may not be degraded. It is preferable that the content of these elements be about 5 moles or less with respect to 100 moles of barium titanate.

Even when some of the barium sites of barium titanate used as the primary component are replaced with an alkaline earth metal which is at least one of calcium (Ca) and Sr, or some of the titanium sites of the barium titanate are replaced with at least one of Zr and Hf, the properties are not degraded. Preferable amounts of Ca, Sr, and the total of Zr and Hf for replacement are about 15 mole % or less, about 3 mole % or less, and about 3 mole % or less, respectively.

Alkali metal oxides such as $Na_2O$ or $K_2O$ or oxides such as $Al_2O_3$ may be present in barium titanate used as the primary component in some cases, and among the oxides mentioned above, it has been confirmed that, in particular, the content of the alkali metal oxide such as $Na_2O$ or $K_2O$ may significantly influence the electrical properties in some cases. In other words, it has been confirmed that when the content of alkali metal oxide as the impurities is controlled less than about 0.02 parts by weight, the electrical properties may not be degraded.

The molar ratio of Ba to Ti, i.e., Ba/Ti, of the barium titanate used as the primary component is preferably in the range of from about 0.99 to 1.02.

In addition, although oxides such as $La_2O_3$ were used as the materials for forming the additive component in the first and the second examples, in addition to that, carbonate salts, hydroxides, alkoxides, metal soaps or the like, may also be used, and the obtained properties are not degraded at all.

Furthermore, the average crystal diameter of the sintered dielectric ceramic composition is not specifically limited; however, it is preferably about 1.0 $\mu$m or less, and more preferably, it is about 0.5 $\mu$m or less.

As has thus been described, by using the dielectric ceramic composition of the present invention, a highly reliable laminated ceramic capacitor can be obtained having stable temperature properties of electrostatic capacitance which can meet the B characteristic specified by JIS and the X7R characteristic specified by EIA, and small degradation of electrostatic capacitor with time. Accordingly, the laminated dielectric ceramic capacitor of the present invention may be used without causing problems even when it is placed at a location at which the temperature considerably varies.

In addition, even when the dielectric ceramic layers constituting the laminated dielectric ceramic capacitor are thin, since the insulating properties at room temperature and high temperature are superior, and the reliability is also superior, and an even smaller dielectric ceramic capacitor having a larger capacitance can be formed by using the thin dielectric ceramic layers. For example, even when the thickness of the dielectric ceramic layer is about 5 $\mu$m or less, a laminated dielectric ceramic capacitor can be formed which can be satisfactory used in practice.

What is claimed is:

1. A dielectric ceramic composition comprising:
   100 moles of a primary component having a perovskite structure represented by the formula $ABO_3$ in which A is Ba which may be partly replaced with Sr or Ca, and B is Ti which may be partly replaced with Zr or Hf;
   an additive component of the formula $a\{(1-b)R+bV\}+cM$ in which R is a compound of at least one element selected from the group consisting of La, Ce, Pr, Nd, Sm, Eu, Gd, Tb, Dy, Ho, Er, Tm, Yb and Lu; V is a compound containing vanadium; M is a compound containing at least one element selected from the group consisting of Mn, Ni, Mg, Fe and Zn; a, b, and c indicate the numbers of moles, $1.25 \leq a \leq 8.0$, $0 < b \leq 0.2$, $1.0 < c \leq 6.0$, and $a/c > 1.1$; and
   an auxiliary sintering agent.

2. A laminated ceramic capacitor comprising:
   a laminate comprising a plurality of dielectric ceramic layers laminated to each other and at least one pair of internal electrodes disposed at different interfaces between the dielectric ceramic layers; and
   a pair of external electrodes on separated external surfaces of the laminate with each member of the pair being electrically connected to a different one of the pair of internal electrodes;
   wherein the dielectric ceramic layers comprise a sintered dielectric ceramic composition according to claim 1, and the internal electrodes comprise a base metal.

3. The dielectric ceramic composition according to claim 1, wherein the auxiliary sintering agent is an oxide containing at least one of B and Si.

4. A laminated ceramic capacitor comprising:
   a laminate comprising a plurality of dielectric ceramic layers laminated to each other and at least one pair of internal electrodes disposed at different interfaces between the dielectric ceramic layers; and
   a pair of external electrodes on separated external surfaces of the laminate with each member of the pair being electrically connected to a different one of the pair of internal electrodes;
   wherein the dielectric ceramic layers comprise a sintered dielectric ceramic composition according to claim 3, and the internal electrodes comprise a base metal.

5. The dielectric ceramic composition according to claim 3, wherein the amount of the auxiliary sintering agent is about 0.2 to 2.0 parts by weight with respect to 100 parts by weight of the primary component.

6. A laminated ceramic capacitor comprising:
   a laminate comprising a plurality of dielectric ceramic layers laminated to each other and at least one pair of internal electrodes disposed at different interfaces between the dielectric ceramic layers; and
   a pair of external electrodes on separated external surfaces of the laminate with each member of the pair being electrically connected to a different one of the pair of internal electrodes;
   wherein the dielectric ceramic layers comprise a sintered dielectric ceramic composition according to claim 5, and the internal electrodes comprise a base metal.

7. The dielectric ceramic composition according to claim 5, wherein the molar ratio of A:B in the primary component is about 0.99 to 1.02.

8. A laminated ceramic capacitor comprising:
   a laminate comprising a plurality of dielectric ceramic layers laminated to each other and at least one pair of internal electrodes disposed at different interfaces between the dielectric ceramic layers; and
   a pair of external electrodes on separated external surfaces of the laminate with each member of the pair being electrically connected to a different one of the pair of internal electrodes;
   wherein the dielectric ceramic layers comprise a sintered dielectric ceramic composition according to claim 7, and the internal electrodes comprise a base metal.

9. The dielectric ceramic composition according to claim 7, wherein the molar ratio of A:B is about 1.00 to 1.02.

10. The dielectric ceramic composition according to claim 9, wherein A is Ba and B is Ti.

11. A laminated ceramic capacitor comprising:

a laminate comprising a plurality of dielectric ceramic layers laminated to each other and at least one pair of internal electrodes disposed at different interfaces between the dielectric ceramic layers; and a pair of external electrodes on separated external surfaces of the laminate with each member of the pair being electrically connected to a different one of the pair of internal electrodes;

wherein the dielectric ceramic layers comprise a sintered dielectric ceramic composition according to claim 10, and the internal electrodes comprise a base metal.

12. The dielectric ceramic composition according to claim 9, wherein A is up to 15 mole % Ca or up to 3 mole % Sr and the balance is Ba; and B is up to 3 mole % of at least one of Zr and Hf and the balance is Ti.

13. A laminated ceramic capacitor comprising:

a laminate comprising a plurality of dielectric ceramic layers laminated to each other and at least one pair of internal electrodes disposed at different interfaces between the dielectric ceramic layers; and a pair of external electrodes on separated external surfaces of the laminate with each member of the pair being electrically connected to a different one of the pair of internal electrodes;

wherein the dielectric ceramic layers comprise a sintered dielectric ceramic composition according to claim 12, and the internal electrodes comprise a base metal.

14. The dielectric ceramic composition according to claim 9, wherein M comprises a compound of Mn or Mg.

15. The dielectric ceramic composition according to claim 9, wherein A is Ba and B is Ti.

16. A laminated ceramic capacitor comprising:

a laminate comprising a plurality of dielectric ceramic layers laminated to each other and at least one pair of internal electrodes disposed at different interfaces between the dielectric ceramic layers; and a pair of external electrodes on separated external surfaces of the laminate with each member of the pair being electrically connected to a different one of the pair of internal electrodes;

wherein the dielectric ceramic layers comprise a sintered dielectric ceramic composition according to claim 15, and the internal electrodes comprise a base metal.

17. The dielectric ceramic composition according to claim 1, wherein A is up to 15 mole % Ca or up to 3 mole % Sr and the balance is Ba; and B is up to 3 mole % of at least one of Zr and Hf and the balance is Ti.

18. A laminated ceramic capacitor comprising:

a laminate comprising a plurality of dielectric ceramic layers laminated to each other and at least one pair of internal electrodes disposed at different interfaces between the dielectric ceramic layers; and a pair of external electrodes on separated external surfaces of the laminate with each member of the pair being electrically connected to a different one of the pair of internal electrodes;

wherein the dielectric ceramic layers comprise a sintered dielectric ceramic composition according to claim 17, and the internal electrodes comprise a base metal.

19. The dielectric ceramic composition according to claim 1, wherein M comprises a compound of Mn or Mg.

20. A laminated ceramic capacitor comprising:

a laminate comprising a plurality of dielectric ceramic layers laminated to each other and at least one pair of internal electrodes disposed at different interfaces between the dielectric ceramic layers; and a pair of external electrodes on separated external surfaces of the laminate with each member of the pair being electrically connected to a different one of the pair of internal electrodes;

wherein the dielectric ceramic layers comprise a sintered dielectric ceramic composition according to claim 19, and the internal electrodes comprise a base metal.

* * * * *